US011095186B2

(12) United States Patent
Guntermann et al.

(10) Patent No.: US 11,095,186 B2
(45) Date of Patent: Aug. 17, 2021

(54) DEVICE FOR DRIVING A COMPRESSOR AND METHOD FOR ASSEMBLING THE DEVICE

(71) Applicant: Hanon Systems, Daejeon (KR)

(72) Inventors: Bernd Guntermann, Lennestadt (DE); David Walisko, Hürth (DE); Stephan Heinrichs, Hürtgenwald (DE)

(73) Assignee: Hanon Systems, Daejeon (KR)

( * ) Notice: Subject to any disclaimer, the term of this patent is extended or adjusted under 35 U.S.C. 154(b) by 77 days.

(21) Appl. No.: 16/416,940

(22) Filed: May 20, 2019

(65) Prior Publication Data

US 2019/0363607 A1 Nov. 28, 2019

(30) Foreign Application Priority Data

May 24, 2018 (DE) .......................... 102018112424.4
Mar. 25, 2019 (DE) .......................... 102019107523.8

(51) Int. Cl.
*H02K 5/22* (2006.01)
*H02K 15/02* (2006.01)
(Continued)

(52) U.S. Cl.
CPC ........... *H02K 5/225* (2013.01); *B60H 1/3222* (2013.01); *H02K 1/18* (2013.01); *H02K 15/02* (2013.01)

(58) Field of Classification Search
CPC .......... H02K 5/225; H02K 15/02; H02K 1/18; H02K 11/33; H02K 3/522; H02K 3/50;
(Continued)

(56) References Cited

U.S. PATENT DOCUMENTS 9,011,105 B2 * 4/2015 Duppert .............. F04C 18/0215
417/32
2016/0365661 A1 * 12/2016 Annis .................... H01R 12/62
(Continued)

FOREIGN PATENT DOCUMENTS

KR 20170120775 A 11/2017
KR 20180023166 A 3/2018
(Continued)

OTHER PUBLICATIONS

English translation of Kobayashi et al (WO 2015146677 A1 ).*
Seo et al (WO 2018038339 A1) English translation, printed on Jan. 19, 2021.*

*Primary Examiner* — John K Kim
(74) *Attorney, Agent, or Firm* — Norton Rose Fulbright US LLP; James R. Crawford

(57) ABSTRACT

Device for driving a compressor of a gaseous fluid having a rotor and a stator disposed extending along a common longitudinal axis. The stator comprises connection leads implemented as segments of conductor wires of coils. The device has a plug housing for receiving a connecting element which is electrically connected with a connection lead of a conductor wire with a plug connector. Support element is disposed on the stator with a receiving member for the plug housing. Receiving member comprises a connecting passage and plug housing is slid into the receiving member in such manner and disposed in the receiving member such that in each instance one connecting passage of the receiving member and the connecting element for receiving a plug connector correspond. Plug housing is filled at least in regions with potting compound and connected with support element under hermetic seal. Methods for assembling the device are provided.

18 Claims, 5 Drawing Sheets

(51) Int. Cl.
*H02K 1/18* (2006.01)
*B60H 1/32* (2006.01)

(58) Field of Classification Search
CPC ......... H02K 5/22; B60H 1/3222; F04B 35/04;
F04B 39/121
USPC .......................................................... 310/71
See application file for complete search history.

(56) References Cited

U.S. PATENT DOCUMENTS

2019/0363607 A1* 11/2019 Guntermann ........ B60H 1/3222
2019/0393750 A1* 12/2019 Guntermann ...... B60H 1/00428

FOREIGN PATENT DOCUMENTS

WO        2015/146677 A1    10/2015
WO    WO-2018038339 A1 *   3/2018   ............. F04C 29/00

* cited by examiner

DEVICE FOR DRIVING A COMPRESSOR AND METHOD FOR ASSEMBLING THE DEVICE

This application claims priority from German Patent Application Nos. 102018112424.4 filed on May 24, 2018 and 102019107523.8 filed on Mar. 25, 2019. The entire contents of these applications are incorporated herein by reference in their entirety.

FIELD OF THE INVENTION

The invention relates to a device, in particular an electric motor, for driving a compressor for the compression of a gaseous fluid, specifically a refrigerant. The compressor can be employed in the refrigerant circuit of a climate control system of a motor vehicle. The device comprises a rotor and a stator disposed along a common longitudinal axis. The stator comprises connection leads developed as segments of coil conductor wires.

BACKGROUND OF THE INVENTION

Compressors known in prior art for mobile applications, in particular for climate control systems of motor vehicles, for the conveyance of refrigerant through a refrigerant circuit, also termed refrigerant compressors, are often developed, independently of the refrigerant, as piston compressors with variable stroke displacement or as scroll compressors. The compressors herein are driven either electrically or by a belt pulley.

Apart from the electric motor for driving the particular compressor mechanism, an electrically driven compressor comprises an inverter for driving the electric motor. The inverter serves for converting direct current of a motor vehicle battery into alternating current which is supplied to the electric motor across electrical connections Conventional electric motors of electrically driven compressors are implemented with an annular stator core with coils disposed thereon and a rotor, wherein the rotor is disposed within the stator core. Rotor and stator are oriented along a common axis of symmetry or rotational axis of the rotor.

The inverter comprises plug connections for the electric connection of plug connectors, developed as separate components and pins, for the electrical connection with connections of the electric motor, which, in turn, are electrically connected with connection leads of conductor wires of the coils of the stator.

The connectors of the electric motor are developed in a plug housing disposed at an end side of the stator oriented in an axial direction of the stator.

The plug connectors disposed on the inverter and implemented as pins are plugged during the assembly of the compressor into a connecting connection or connection port provided in the plug housing and are each contacted with an end fitting, connected with a corresponding conductor wire, in particular of a connection leads of the conductor wire. The end fitting is herein electrically and mechanically connected with the connection leads of the conductor wire such that a low contact resistance is always ensured between the plug connectors of the inverter and the conductor wire. To ensure simultaneously an electric connection with high insulation resistance, for example between the connection leads of the conductor wires, the non-insulated ends of the connection leads or the conductor wires, also termed phase conductors, must be electrically isolated, specifically hermetically sealed, from one another and from other electrically conducting components of the stator as well as of the motor housing. The end fittings, connected with the connection leads of the conductor wires, must furthermore be placed at a previously determined position on the stator in order to secure the correct and fast assembly of the electric motor, in particular of the plug connectors as the electrical connections of the inverter with the stator. With the insufficiently precise disposition of the connection leads of the conductor wires on the stator, neither the assembly of the end fittings on the connection leads, or of the conductor wires, nor the assembly of the stator on the motor housing is possible.

In prior art electric motors of electrically driven compressors a plug housing for receiving the ends of the connection leads of the conductor wires are secured by pressing it onto the stator insulation. The plug housing is hereby fixed in position during the assembly.

WO 2015/146677 A1 discloses an electrically driven compressor with a compression assembly, an electric motor for driving the compression assembly and an inverter for supplying the electric motor with power. The electric motor comprises a rotor and a stator with an electrically insulating coil body disposed at an end of a stator core, coils disposed on the coil body and a plug housing with connecting ports for the electric connection of the coils with the inverter. The plug housing is mechanically connected with the stator at the end side on the coil body with the aid of latching mechanisms or a spring closure, in particular across snap hooks.

The preferably plastic-insulated connection leads of the discrete phases of the electric motor, developed as segments of the conductor wires, implemented in particular of lacquered copper wire, of the coils must always be connected with the end fittings which are subsequently introduced into the plug housing before the plug housing is secured on the coil body. To seal the interior of the plug housing toward the outside to prevent, for example, the gaseous fluid to be compressed from penetrating into the plug housing and therewith to decrease of the insulation resistance as well as the occurrence of short-circuits, at the passage of each end fitting of a connection lead of a conductor wire into the plug housing a separate sealing element, in particular a sealing ring, is provided.

In addition, the use of a two-part plug housing requires an additional sealing for sealing the plug housing.

When assembling an electric motor in a compressor, the connection leads, secured on terminal clamps and curved about the stator core, of the connector wires generate a circular tangential force acting outwardly in the radial direction, which can lead to the displacement of the plug housing. In conventional electric motors the connection leads, or the conductor wires, are fixed in position using additional securement elements such as adhesive tape or wax insulation tape.

The invention addresses the problem of providing and improving a device, in particular an electric motor, for driving an electrically driven compressor of a gaseous fluid which can be assembled simply and therefore time-savingly. The plug housing as well as the connection leads of the conductor wires, in particular the ends of the connection leads of the conductor wires disposed within the plug housing, are herein to be hermetically sealed with respect to one another and to the circumjacent electrically conducting components. The device is to comprise the least possible number of individual components and structural parts to decrease for example the weight and installation space requirements, as well as be constructionally simply realizable in order to minimize the production costs also.

The problem is resolved through the subject matters with the characteristics of the independent patent claims. Further developments are specified in the dependent patent claims.

SUMMARY OF THE INVENTION

The problem is resolved through a device, in particular an electric motor, according to the invention for driving a compressor of a gaseous fluid. The device comprises a rotor and a stationary stator which extend along a common longitudinal axis. The stator comprises connection leads developed as segments of conductor wires of coils and is advantageously positioned so as to encompass the rotor on an outer side.

In the proximity of the coils the conductor wires are advantageously implemented of lacquer-coated and wound copper wire with the non-wound ends of the conductor wires as connection leads brought out of the particular winding and preferably being insulated by synthetic material coating.

According to the concept of the invention at least one plug housing is developed for receiving at least one connecting element. The connecting element is electrically connected with a connection lead of a conductor wire and implemented for the electrical connection with a plug connector. In contact on the stator, in particular at an end side oriented in the axial direction, of the stator, is disposed a support element with at least one receiving member for the at least one plug housing. The receiving member comprises at least one connection passage for receiving a plug connector.

The support element and the at least one receiving member for the at least one plug housing are advantageously implemented as a cohesive unit and integral component such that the receiving member is a constituent part of the support element.

By axial direction is herein to be understood the direction of the longitudinal axis of the stator, which also corresponds to the longitudinal axis and the rotational axis of the rotor.

An end side oriented in the axial direction is disposed in a plane oriented perpendicularly to the longitudinal axis.

According to the invention, the plug housing is slid into the receiving member and herein disposed such that in each instance one connection passage of the receiving member and the connecting element of the plug housing for receiving a plug connector, in particular for plugging-in the plug connector, correspond to one another. The plug housing is furthermore at least in regions filled with a potting compound and connected under hermetic seal with the support element.

The connecting element advantageously comprises a first connection member and a second connection member. The first connection member is electrically connected with the connection lead of a conductor wire. The second connection member is implemented for the electric connection with a plug connector.

The plug housing is preferably inserted in a predetermined direction of motion into the receiving member and disposed therein such that in each instance one connection passage of the receiving member and a second connection member of the connecting element for receiving a plug connector correspond to one another.

The connection passage of the receiving member and the second connection member of the connecting element of the plug housing are preferably oriented concentrically with respect to one another for receiving the plug connector.

One advantage of the invention comprises that the plug housing is secured in position within the receiving member and therewith on the support element. The plug housing can preferably be slid into the member in a direction extending in a perpendicular plane to the longitudinal axis.

According to a further development of the invention, the plug housing comprises a first housing part and a second housing part which are preferably implemented either as two separately developed components or as a linked unit. The housing parts of the linked unit are herein connected across a hinged connection such that they are foldable toward one another.

The housing parts are advantageously implemented to be connectable under form closure and thus connectable with one another.

The connecting element electrically connected with the connection lead of the conductor wire is preferably secured in position between the first housing part and the second housing part. The connecting element is herein entirely positioned between the housing parts.

According to an especially advantageous structuring of the invention, the plug housing is developed for receiving three connecting elements, each with a first connection member and a second connection member, wherein the first connection member is electrically connected with a connection lead, or a conductor wire, in particular of a phase. The receiving member implemented on the support element consequently comprises three connection passages.

According to a further preferred structuring of the invention, the plug housing is developed with at least one first chamber, one second chamber and one third chamber. The number of first, second and third chambers in each plug housing depends on the number of the connecting elements disposed in the plug housing.

Herein preferably one connection lead of a conductor wire is disposed such that it penetrates into the first chamber as well as through the first chamber up into the second chamber such that the connection lead of the conductor wire terminates within the second chamber. The connection lead is preferably introduced into the first chamber of the plug housing through a feedthrough developed in the second housing part.

A further advantage of the invention comprises that the first chamber in each case is filled with a potting compound for hermetically sealing the plug housing. The potting compound can fill out the entire volume of the first chamber.

The connecting element is disposed with the first connection member within the second chamber as well as with the second connection member within the third chamber and consequently overlapping the two chambers.

According to a further development of the invention the second connection member of the connecting element is implemented in the form of an eye for at least partially encompassing the plug connector. The eye can herein be closed or open, in particular slotted, and, consequently, with the disposition on the plug connector establishes an electrical connection between the second connection member and thus with the connecting element as well as the plug connector.

According to a preferred structuring of the invention, the support element is implemented with a radially oriented annular surface and an axially oriented annular surface, which are disposed in contact on outer side edges and connected with one another. The receiving member for the plug housing is preferably developed as a subregion of the radially oriented annular surface of the support element.

The radially oriented annular surface of the support element advantageously has the form of an annulus in particular of a sector of the annulus or of an open annulus, while the axially oriented annular surface of the support element has the form of a cylinder, in particular of a circular cylinder, specifically of a hollow circular cylinder.

According to a further advantageous structuring of the invention, the support element comprises at least one guide member for the guidance of at least one connection lead of a conductor wire.

A first guide member is preferably developed with a wall in the form of a circumferentially open sector of an axially oriented cylindrical, in particular hollow cylindrical, annular surface. The first guide member is preferably connected with the support element in contact on the radially oriented annular surface of the support element, in particular with a lower end side in contact on an inner side edge of the radial annular surface. The at least one connection lead of the conductor wire is advantageously in a transition region of the wall of the first guide member to the radial annular surface of the support element in contact on the first guide member and on the support element.

A further advantage of the invention comprises that at least one second guide member is implemented in the form of a retaining bracket which, projecting outwardly in the radial direction, is disposed on the wall of the first guide member.

The at least one second guide member is preferably implemented on an upper end side of the wall of the first guide member such that the connection lead of the conductor wire is disposed between the second guide member and the radially oriented annular surface of the support element. Within the radially oriented annular surface of the support element an outforming, in particular in the form of an indentation or an opening, can be implemented oppositely to the at least one second guide member in the axial direction.

According to a further development of the invention, the support element comprises at least one resiliently deformable pressure member with a contact region. The pressure member can be implemented substantially having an extent in the axial direction. In the assembled state of the device the pressure member is in contact with its contact region on a mating surface under resilient deformation. The contact region of the pressure member can, for example, be developed as a contact surface as a contact edge or also in the form of a point.

Due to pressure applied through the resilient deformation of the pressure member onto the support element, the support element with the receiving member with the connection passages for the plug housing with the connecting ports is pressed against the stator and in this manner protection against undesirable relative movements of the support element with respect to the stator is ensured.

A further advantage of the invention comprises that the support element with the receiving member and the guide members as well as optionally the at least one pressure member is implemented as a linked unit and integral component such that the receiving member, the guide members and, depending on the structuring, also the pressure member are constituents of the support element. The support element is consequently implemented as a multifunctional component, in particular of the stator.

The pressure member and the receiving member for the disposition of the plug housing with connecting ports are disposed at a common side, oriented in the axial direction, of the support element.

According to a further advantageous structuring of the invention, in the case of implementation of the support element with a multiplicity of pressure members, the pressure members are disposed on the support element distributed over a circumference. By multiplicity are to be understood at least two pressure members.

The problem is also resolved through a method according to the invention for assembling the device, in particular an electric motor, for driving a compressor of a gaseous fluid. The method comprises the following steps:

disposing a rotor and a stator on a common longitudinal axis, wherein the stator encompasses the rotor in the radial direction, disposing a support element at a first end side, oriented in an axial direction, of the stator, disposing at least one connecting element with a connection lead, electrically connected with the connecting element, of a conductor wire, or without the connection lead, on a first housing part of a plug housing, disposing a second housing part of the plug housing onto the first housing part with the at least one connecting element disposed thereon as well as securing in position the second housing part on the first housing part such that the connecting element is disposed between the housing parts, introducing at least one connection lead of a conductor wire through a feedthrough developed in the second housing part into the plug housing and connecting the connection lead of the conductor wire with the connecting element after the connecting element without connection lead has been disposed on the first housing part, introducing the plug housing into a receiving member implemented on the support element and this way securing the plug housing in position on the support element as well as filling a potting compound into at least one first chamber of the plug housing and in this manner hermetically sealing the plug housing.

According to a further development of the invention, the plug housing with the at least one connection lead, electrically connected with the particular connecting element, of the conductor wire is inserted in a predetermined direction of motion into the receiving member of the support element disposed on the stator and secured in position in a predetermined final position.

The advantageous structuring of the invention enables the use of the device, in particular of an electric motor, for driving a compressor for the compression of a gaseous fluid for a compressor of a refrigerant in a refrigerant circuit of a climate control system of a motor vehicle.

In summary, the device according to the invention for driving a compressor of a gaseous fluid with a minimal number of required components and the method for assembling the device comprises further diverse advantages:

fully hermetic sealing of electrically active connection components exclusively by means of a potting compound without additional sealing elements and securing the conductor wires in place, in particular of the connection leads, without additional securement means, thereby best possible electrical insulation and optimized length of the connection leads of the conductor wires as well as minimal costs and minimal weight, in particular full and complete sealing of the connecting elements and prevention of penetration of the fluid flowing through the compressor, which avoids occurrences of short circuit currents between the connecting elements as well as further electrically conductive, inactive components, variably constructible process of connecting the connection leads of the conductor wires on the plug housing, even after the disposition of the plug housing in the receiving member of the support element, simple assembly, in particular of the plug housing itself and on the support element as well as securing the support element with the receiving member for the plug housing with the connecting ports in position on the stator, thereby clear and unambiguous positioning of the plug housing with the connecting ports due to the definite and unambiguous positioning of the support element with the receiving member for the plug housing before the assembly into the motor housing, prevention of relative movements of the support element with the receiving member, and therewith of the plug housing with the connecting ports for receiving plug connectors as electrical connections to the inverter, with respect to the stator during the assembly of the device, therewith simple assembly of the device, in particular when placing the stator with the rotor into a motor housing, as well as reduction of vibration-caused destruction at the interface of the connecting ports between stator and inverter, in particular destruction of the plug connectors implemented as pins, also termed electric pins, during operation of the device and therewith maximizing the service life of the compressor.

Further details, characteristics and advantages of embodiments of the invention will be evident based on the following description of embodiment examples with reference to the associated drawing.

DETAILED DESCRIPTION

Figure 1A:
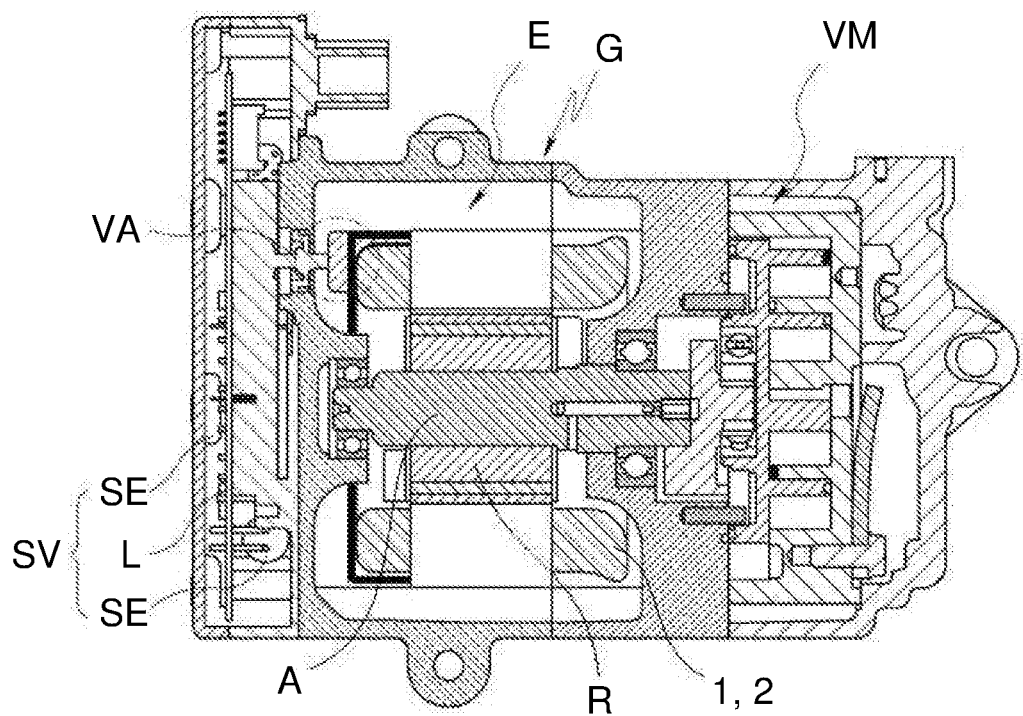
FIG. 1A shows an electrically driven compressor with an electric motor as a device for driving a compression mechanism, in sectional representation.

FIG. 1A reveals an electrically driven compressor with an electric motor E, disposed in a housing H, as a device for driving a compression mechanism CM, in a sectional representation. The electric motor E is supplied with electric power across a switching means SM.

The electric motor E comprises a stator 1 with a stator core 2 of substantially hollow cylindrical form and coils wound onto the stator core 2 as well as a rotor R disposed within the stator 1.

The rotor R is set into rotational motion when electric power is supplied to the coils of the stator 1 across a connection arrangement CA. The connection arrangement CA is implemented at an end side of stator 1 and comprises a multiplicity of electric connections.

Rotor R is disposed coaxially within stator 1 and such that it is rotatable about an axis of rotation. A drive shaft D can be implemented integrally with the rotor R or as a separate element.

The electric motor E as well as the compression mechanism CM, implemented as a scroll compressor with a stationary and an orbiting spiral, are disposed within a volume encompassed by housing H. The housing H is herein implemented of a first housing part for receiving the electric motor E and a second housing part for receiving the compression mechanism CM and is as well preferably of a metal, in particular of an aluminum material.

The orbiting spiral of the compression mechanism CM, in which the gaseous fluid, specifically a refrigerant, is compressed, is driven across the drive shaft D connected with rotor R of the electric motor E. According to a not depicted implementation, the compression mechanism can also be implemented with a wobble plate.

The switching means SM for controlling the operation of the electric motor E comprises a printed circuit board PCB implemented with various switching elements SE. On the printed circuit board various electrically connected trigger circuits and components are mounted which are supplied with electric power from a power line of an external power source.

Figure 1B:
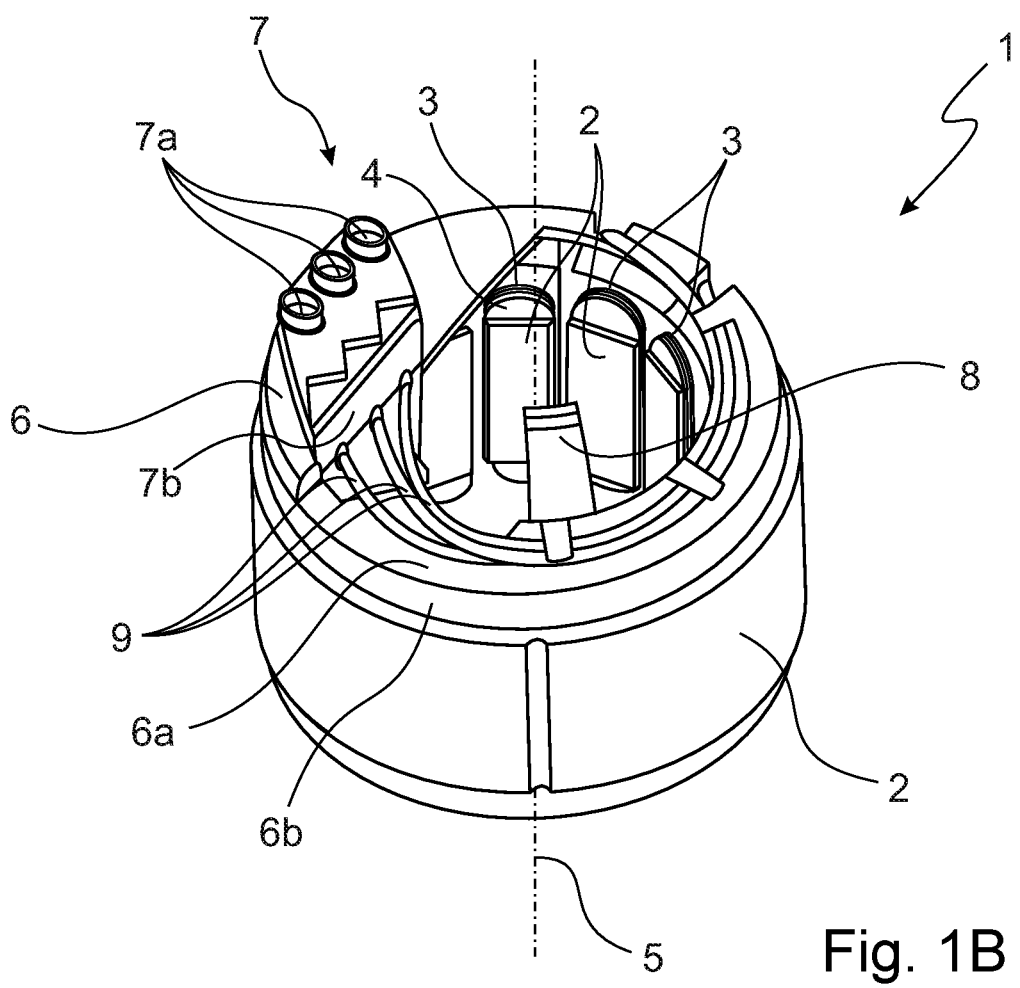
FIG. 1B shows a stator of an electric motor as a device for driving a compressor of a gaseous fluid with a stator core, coils, an insulation element and a support element with a receiving member for a plug housing, in a perspective view.

FIG. 1B shows in perspective view the stator 1 of the electric motor as a device for driving a compressor of a gaseous fluid, specifically for a climate control system of a motor vehicle, for conveying refrigerant through a refrigerant circuit. The stator 1 is implemented with the stator core 2, coils 3, an insulation element 4 as well as with a support element 6 with a receiving member 7 for a plug housing 7b as components of the connection arrangement CA. The electric motor, for example a three-phase alternating current motor, comprises the rotor, not shown, and the stator core 2 disposed in the radial direction at an outer side of the rotor, and thus about the rotor. The stator core 2, preferably implemented as a laminated sheet package, and the insulation element 4, implemented of an electrically insulating material, extend along a longitudinal axis 5, which also corresponds to the longitudinal axis of stator 1 and the rotational axis of the rotor, from a first end side to a second end side of stator 1. The insulation element 4 is advantageously implemented as a coating of the stator core 2 and thus forms an integral component.

The coils 3 are each implemented of a wire, wound about the radially inwardly extending region of stator core 2, as an electrical conductor, also termed conductor wire 9. The non-wound ends of the conductor wires 9 are brought out of the particular winding as connection leads. The regions, extending inwardly in the radial direction, of the stator core 2 have each the form of a web and are positioned uniformly distributed over the circumference of an outer wall of stator core 2. Between the conductor wires 9 of coils 3 and the particular regions of stator core 2 is disposed the insulation element 4 that electrically insulates stator core 2 and conductor wires 9 of coils 3 from one another. At the ends of the webs, oriented inwardly and in the axial direction, the insulation element 4 is implemented such that it is widened in the axial direction. The end segments projecting thusly from the insulation element 4 serve for fixing the conductor wires 9 of coils 3 wound about the webs of stator core 2.

The stator core 2, the insulation element 4 and the coils 3 form the stator unit of the electric motor.

At the first end side of stator 1 is disposed a support element 6 with a receiving member 7 with connection passages 7a for a plug housing 7b with connecting ports. The connecting ports of plug housing 7b serve as constituents of an electrical connection between the coils 3 of the electric motor and the inverter, for example with the aid of electrically conductive pin-shaped plug connectors which, after having been guided through the connection passages 7a of the receiving member 7 of the support element 6, are disposed plugged into the connecting ports of the plug housing 7b.

The connection leads of conductor wires 9 of coils 3 and the connecting ports of the plug housing 7b disposed in the receiving member 7 are electrically connected.

In the assembled state of stator 1 the support element 6 is in contact in the axial direction on stator 1, on the one hand, in particular on stator core 2. The outer diameter of the support element 6 is herein less than the outer diameter of the stator core 2.

The support element 6 with the receiving member 7 for the plug housing 7b, in addition, comprises, on the other hand, a resilient pressure member 8 extending substantially in the axial direction. The receiving member 7 and the pressure member 8 are disposed on a common side, oriented in the axial direction and directed away from the stator core 2, of the support element 6.

The support element 6 comprises, furthermore, a radially oriented circular ring-form annular surface 6a, in particular a sector of a circular ring-form annular surface, as well as an axially oriented cylinder-form, in particular hollow cylinder-form, annular surface 6b which are in contact on one another on outer side edges and are connected with one another. The receiving member 7 for the plug housing 7b is implemented as a subregion of the radially oriented annular surface 6a and thus as a constituent of the support element 6.

The hollow-cylindrical wall of the axially oriented annular surface 6b of support element 6 has an outer diameter smaller than the outer diameter of the outer wall of stator core 2 and an inner diameter greater than the inner diameter of the outer wall of stator core 2.

The resilient pressure member 8 is disposed in a region, in particular at an inner side edge, of the radially oriented circular ring-form annular surface 6a and preferably has the form of an arc or a spring. The pressure member 8, like the receiving member 7 for the plug housing 7b, is implemented as a constituent of the support element 6. The support element 6 with the radial annular surface 6a, the axial annular surface 6b, the receiving member 7 with the connection passages 7a for the plug housing 7b with the connecting ports and the pressure member 8 are implemented as a unit, in particular as an integral injection molded element. The implementation as a single part is realized within a molding process.

The pressure member 8 comprises a web, disposed substantially oriented in the axial direction, and a contact region, substantially oriented in the radial direction. The pressure member 8 is connected with the radial annular surface 6a across an end edge of the web. At an end, developed distally to the end edge of the web, the pressure member 8 comprises the contact region which advantageously is developed as a contact surface. In the mounted state of the electric motor, the pressure element 8 is in contact with its contact surface on a not depicted housing of the electric motor. After the stator with the support element 6 has been mounted within the motor housing, which means specifically when inserting or 'squeezing' stator 1 into the motor housing and the pressure applied of the motor housing onto the pressure member 8, in particular the web of the pressure member 8 is resiliently deformed.

As a constituent of the support element 6, the pressure member 8 has a defined rigidity corresponding to the geometry and the mechanical dimensions of support element 6. When mounting the stator 1 in the motor housing, between the support element 6 and a surface, developed as a closed end of the motor housing, a force, in particular a spring force, substantially acting in the axial direction, is built up and in this manner the support element 6, due to the resilient properties of pressure member 8, is pressed in the direction toward the stator 1, in particular in the direction of stator core 2. With the contact of pressure member 8 on the motor housing and the resilient deformation of pressure member 8, the force acts thereby onto the support element 6. Consequently, after the process of mounting the electric motor and thus after the process of joining or pressing the stator 1 with the support element 6 into the motor housing, by means of the deformation of the pressure member 8 a prestress is generated which stays the support element 6 and prevents any movement of the support element 6 or of the receiving member 7 with the plug housing 7b during the operation of the electric motor and, consequently, of the compressor. The support element 6 with the receiving member 7 and the plug housing 7b disposed in the receiving member 7 is fixed on the stator 1 specifically in the axial direction.

While the electric motor is mounted, the connection leads of the conductor wires 9, secured on terminal clamps in the plug housing 7b and guided at a curvature in the support element 6, generate a tangential force acting circularly outwardly in the radial direction which can lead to a displacement or a turning of the support element 6 with the receiving member 7 for the plug housing 7b out of the required position. The plug housing 7b is positioned within the receiving element 7 and is herein positioned between the support element 6 and the insulation element 4. Since the plug connectors, developed as separate components and as pins and disposed across connecting ports on the inverter, can only in the required position of the plug housing 7b, and therewith of the receiving member 7 with the connection passages 7a, relative to stator 1 be engaged into the connecting ports developed in the plug housing 7b, the support element 6 with the receiving member 7 is fixed in place before the stator 1 is mounted in the motor housing on the stator 1 in the position necessary in order to prevent the displacement or the turning out of position of the plug housing 7b disposed in the receiving member 7 relative to the stator 1. The stator 1, especially the insulation element 4 of stator 1, is herein implemented with a first, not shown, element of a system for the protection against movements, or rotation lock system, of the support element 6 in the circumferential direction of stator 1, while the support element 6 comprises a second, also not shown, element of the rotation lock system.

The system for the protection against movement of the support element 6 in the circumferential direction of stator 1 is based on the implementation of form closure elements such that for each first element of the system a second element, corresponding in form thereto, is provided.

Through the form-closure connection implemented between the support element 6 and the insulation element 4, the support element 6, therewith the receiving member 7 for the plug housing 7b and consequently also the plug housing 7b itself, are secured in position on the insulation element 4 against a rotation about the longitudinal axis 5 and in particular through the pressure member 8 in the radial direction and are as well also disposed to be always oriented in the desired manner relative to stator 1 in order to introduce during the mounting of the electric motor the plug connectors, disposed on the inverter and developed as pins, into the connecting ports developed in the plug housing 7b.

Figure 2:
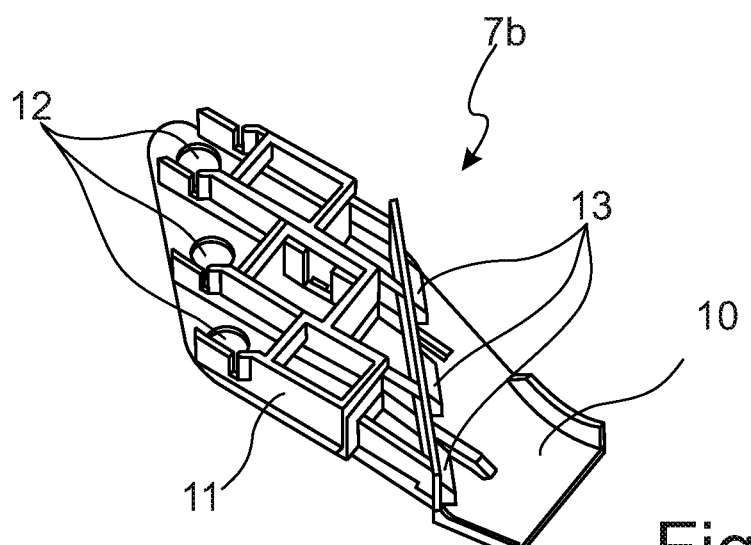
FIG. 2 shows the plug housing with a first and a second housing part, in perspective view.

FIG. 2 depicts the substantially two-part plug housing 7b with a first housing part 10 and a second housing part 11 in a perspective view. The first housing part 10, developed with a flat bearing surface serves as a lower carrier component for the disposition of the second housing part 11 as an upper cover component.

According to a not depicted embodiment, the two housing parts are connected such that they are movable relative to one another. The housing parts can herein be coupled across a hinge and thus via a fold function.

In the region of an end face the flat bearing surface of the first housing part 10 comprises passage openings 12 of the connecting ports of the plug housing 7b for feeding through the plug connectors disposed on the inverter. The second housing part 11 comprises in the region of an end side, which, in the mounted state of the plug housing 7b, is developed distally to the end side of the first housing part 10 with the passage openings 12, in each instance one feedthrough 13 for receiving a connection lead of a conductor wire 9.

In the mounted state of plug housing 7b the housing parts 10, 11 are fixed relative to one another. The housing parts 10, 11 are herein preferably connected with one another across at least one hinge means, in particular a snap closure. Between housing parts 10, 11, not-depicted, connection members are disposed for the connection with the connection leads of the conductor wires 9.

Figure 3A:
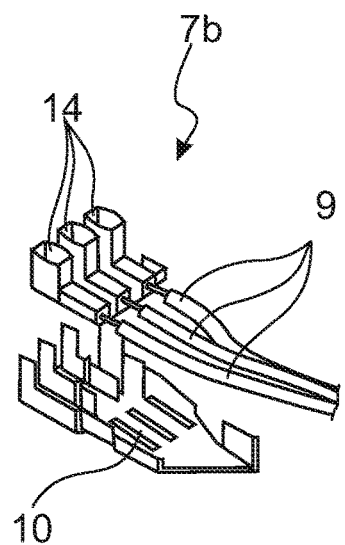
FIG. 3A to 3C shows the plug housing with connection leads, or conductor wires, during the process of assembly, each in a perspective view.
Figure 3B:
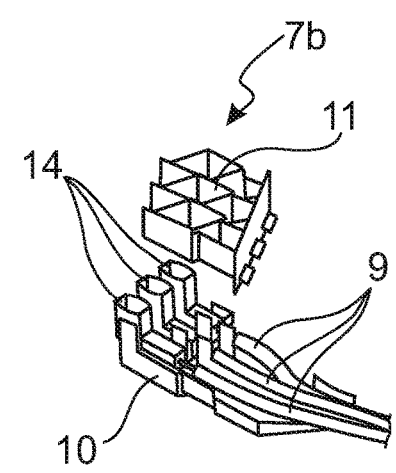
Figure 3C:
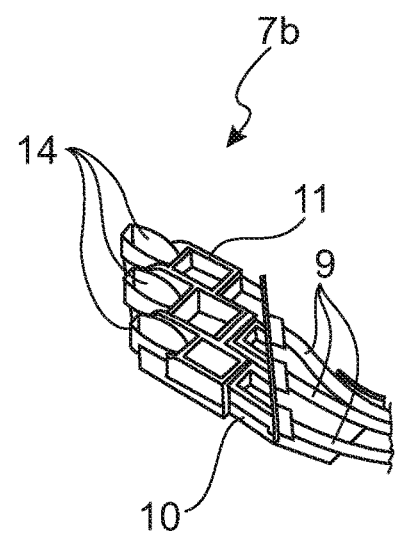
Figure 3D:
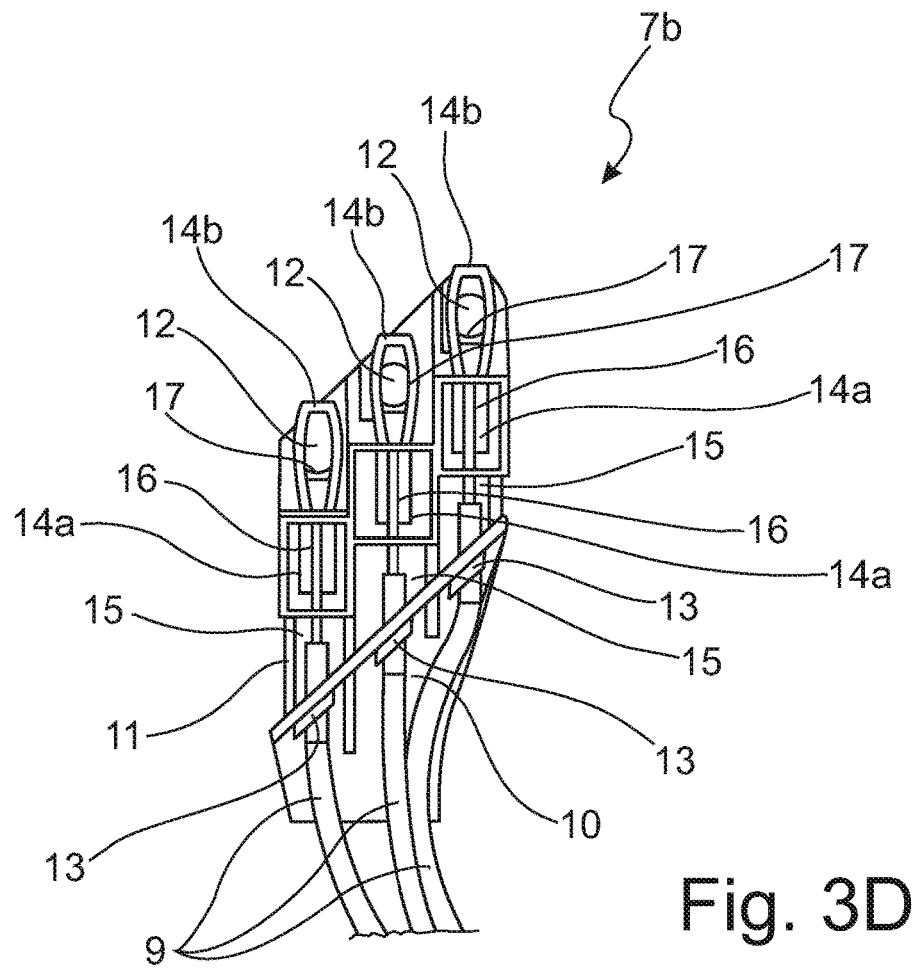
FIG. 3D shows the plug housing with the connection leads of the conductor wires in the assembled state in a top view.

FIG. 3A to 3C show the plug housing 7b with connection leads of the conductor wires 9 during the process of mounting, each in a perspective view. In FIG. 3D the plug housing 7b is shown in top view with the connection leads of the conductor wires 9 in the mounted state.

During the mounting process the connecting elements 14 according to FIGS. 3A and 3B are optionally disposed with or without the connection leads, or conductor wires 9, having been previously connected with the connecting element 14, on the first housing part 10 as the carrier component.

The first housing part 10 is provided with appropriate shapings developed as receivers. This is also done for the purpose of excluding the misdisposition of the connecting elements 14 on the first housing part 10. The shapings developed on the first housing part 10 herein correspond to the form of the connecting elements 14.

According to FIGS. 3B and 3C the second housing part 11 as the cover component of the plug housing 7b is subsequently placed onto the first housing part 10 with the connecting elements 14 disposed thereon of the connection leads of the conductor wires 9 and locked in place. With the implementation of the at least one snap lock, in particular with the snap-in lock, the connecting elements 14 are fixed between the housing parts 10, 11 in the plug housing 7b and always fixed in the intended position.

The connection leads of the conductor wires 9 are herein fed through a feedthrough 13 implemented in the second housing part 11 or, fed between the housing parts 10, 11 through the feedthrough 13, are mechanically and electrically connected within the plug housing 7b with a connecting element 14. With the implementation of the plug housing 7b in two parts, there is the feasibility to connect, after the connecting element 14 has been placed onto the first housing part 10, or also after the housing parts 10, 11 have been connected with one another, to connect the connection lead, or the conductor wire 9, to the relevant connecting element 14. Independently thereof, the connection lead of the conductor wire 9 can also be connected with the particular connecting element 14 before assembling the housing parts 10, 11. The connecting elements 14 are subsequently disposed on the first housing part 10 with the connected connection lead of the conductor wire 9.

As shown especially in FIG. 3D, in the assembled state the plug housing 7b comprises for each connection of a connection lead of a conductor wire 9 with the plug housing 7b three types of chambers 15, 16, 17 with different functions and implementations.

The connection leads of the conductor wires 9 fed through the feedthroughs 13 into the plug housing 7b, specifically into the first chambers 15, are in each instance disposed traversing the first chamber 15 and terminating within a second chamber 16. The connecting elements 14 are disposed with a first connection member 14a for connecting with a connection lead of a conductor wire 9 in a second chamber 16 and with a second connection member 14b for the connection with a plug connector disposed in a third chamber 17 such that they overlap chambers 16, 17.

After mounting the plug housing 7b, in particular after connecting the housing parts 10, 11 with the connecting elements 14 bedded between the housing parts 10, 11 as well as connecting the connection leads of the conductor wires 9 with the first connection members 14a of the connecting elements 14, a potting compound is filled into the first chambers 15 in order to, and in this manner and in combination with the flat bearing surface of the first housing part 10, to produce a hermetic sealing of the electrically conductive connecting elements 14 as well as of the electrical connection of the connection leads of the conductor wires 9 with the connecting elements 14 within the plug housing 7b. The hermetic seal prevents short circuit currents between the connecting elements 14 or connection leads of the conductor wires 9 as well as the inactive electrically conductive components of the electric motor. In addition, the insulation resistance within the compressor driven by the electric motor is improved.

The potting compound is preferably introduced after the plug housing 7b has been mounted into the receiving member 7 of support element 6 into the first chambers 15.

Within the second chambers 16 the electrical connections of the connection leads of the conductor wires 9, specifically the ends of the connection leads, with the first connection members 14a of connecting elements 14 are disposed. If, depending on the method of assembly of the plug housing 7b or of the device, the permanent connecting of the connection leads of the conductor wires 9 with the first connection members 14a of the connecting elements 14, is established, for example by crimping, soldering or welding, only after the method step of disposing and fixing the connecting elements 14 in the plug housing 7b takes place, the second chamber 16 has in each instance sufficient space for inserting the required connecting tool.

The wall of the third chamber 17 comprises a passage opening 12 provided in the first housing part 10 for introducing an electrically conductive, pin-form plug connector for the electric connection of the electric motor and the inverter. The second connection members 14b, each disposed in the third chamber 17, of the connecting elements 14 are implemented for receiving the plug connector, in particular one end of the pin-form plug connector, in the form of an eye. During the assembly of the electric motor a plug connector coupled with the inverter is inserted through the passage opening 12 of plug housing 7b into the eye of the second connection member 14b. The outer side of the plug connector is herein in contact on the inner side of the eye-shaped wall of the second connection member 14b so as to be electrically conducting. Since the connecting elements 14 with the first connection member 14a and the second connection member 14b are each developed as a unitary, electrically conducting component, an electrically conducting connection is consequently ensured between the plug connectors and the connection leads of the conductor wires 9.

The plug housing 7b can be developed for any desired number of connecting elements 14. There is additionally the feasibility of disposing a multiplicity of plug housings 7b on the support element 6, specifically in receiving members 7.

Figure 4A:
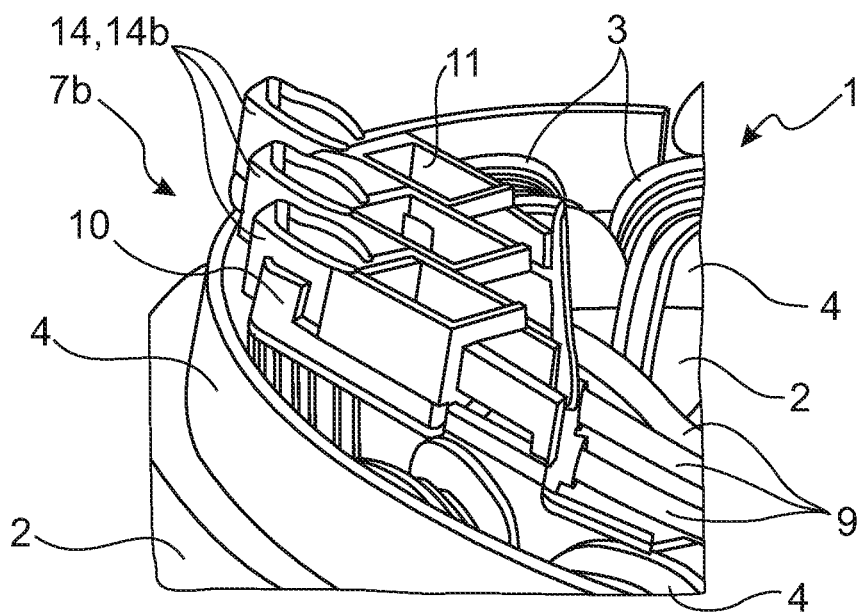
FIG. 4A to 4C each provide a detail view of an end side of the stator from FIG. 1B, FIG. 4A without support element, however with plug housing, as well as FIGS. 4B and 4C—each with support element and assembled plug housing.
Figure 4B:
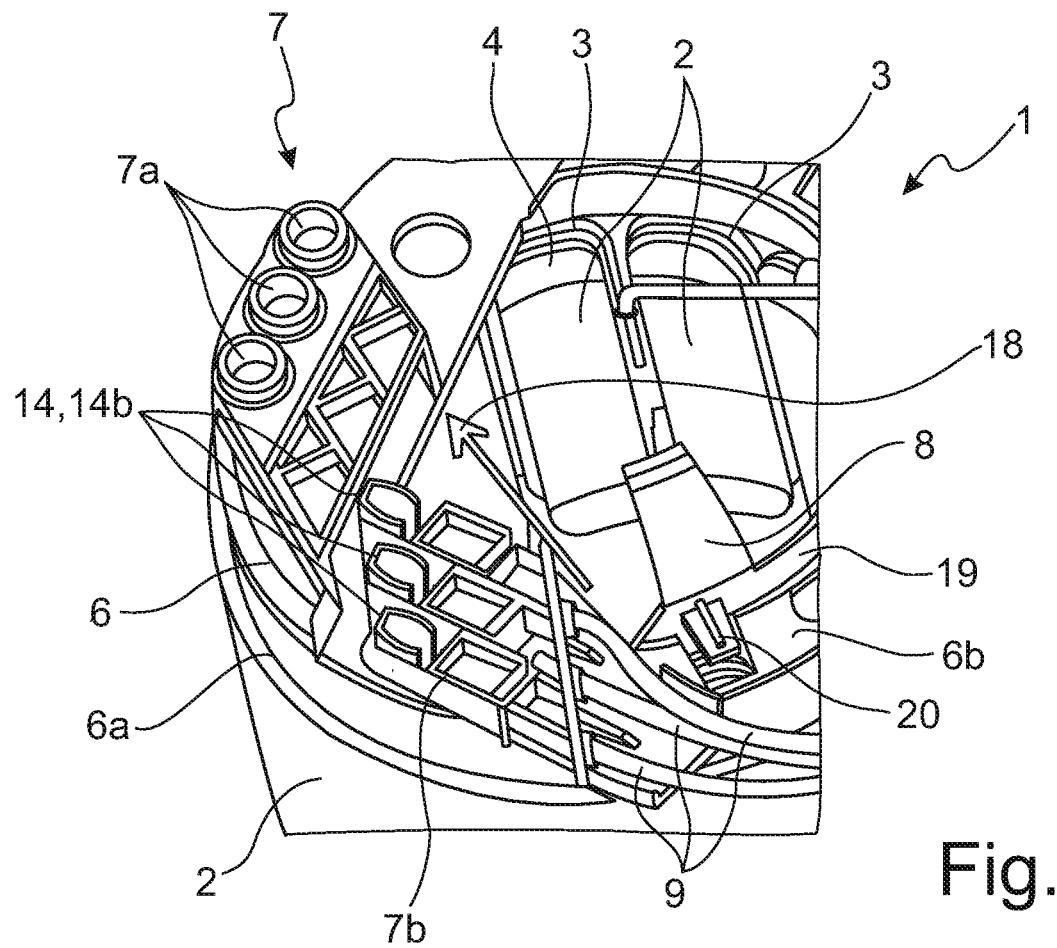
Figure 4C:
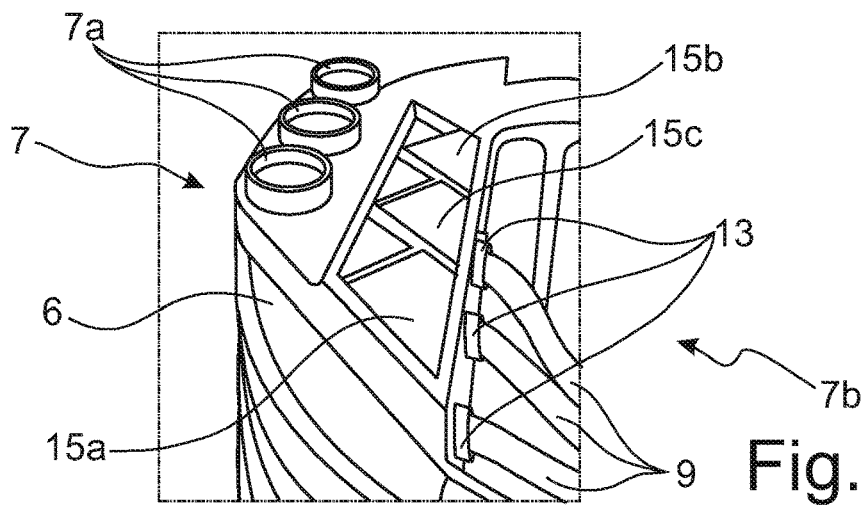

FIG. 4A to 4C show a detail view of an end side of stator 1 from FIG. 1B, according to FIG. 4A without support element 6, however with plug housing 7b and according to FIGS. 4B and 4C each with support element 6 and with the plug housing 7b mounted in the receiving member 7.

As shown in particular in FIG. 4A, the insulation element 4 at the end side of stator 1 projects beyond the stator core 2. The region of the insulation element 4 projecting from stator core 2 has substantially a hollow cylindrical-form wall which is disposed in the axial direction. The support element 6 is disposed with the radially oriented circular ring-form annular surface 6a in the region of the end side of the wall of insulation element 4, as well as with the axially oriented cylinder-form annular surface 6b at the shell surface of the wall of insulation element 4. The outer diameter of the wall of the insulation element 4 corresponds substantially to the inner diameter of the support element 6 in the region of the axially oriented hollow cylindrical-form annular surface 6b plus a tolerance or gap for mounting.

During the process of mounting the compressor, in particular of the electric motor, according to FIG. 4B the preassembled plug housing 7b with the connection leads, electrically connected with the connecting elements 14, of the conductor wires 9 is slid in the direction of motion 18 into the receiving member 7 of the support element 6 disposed on the stator core 2. Sliding the plug housing 7b into the receiving member 7 takes place similarly to closing a drawer. The plug housing 7b is herein moved toward the receiving member 7 until the connecting ports of the plug housing 7b, in particular the openings of the eyes of the second connection members 14b of the connecting elements 14, as well as the passage openings 12 of the first housing part 10 are positioned coaxially to the connection passages 7a implemented in the receiving member 7 such that the pin-form plug connectors implemented on the inverter can be inserted through the connection passages 7a of the receiving member 7 of the support element 6 into the connecting ports of the plug housing 7b and therewith into the eyes of the second connection members 14b of the connecting element 14.

The first chambers 15 of the plug housing 7b are subsequently filled with the potting compound. FIG. 4C shows the plug housing 7b plugged into the receiving member 7 with the chambers 15 filled with the potting compound.

Figure 4D:
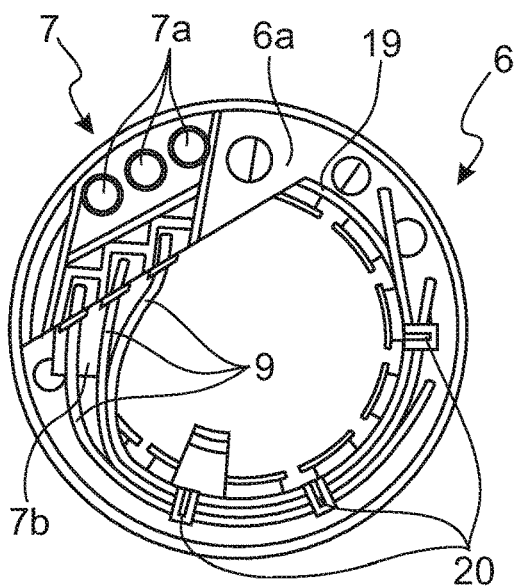
FIG. 4D to 4F show the support element with first and second guide members for disposing and guiding the connection leads of the conductor wires on the support element.

At a length of the magnetically inactive portions of the connection leads of the conductor wires 9, adapted to the form of the support element 6, the plug housing 7b can be slid into the receiving member 7 of the support element 6 such that simultaneously at a length, minimized for the support element 6, of the connection leads of the conductor wires 9, the connection leads can be fixed and guided without additional components for their securement solely through the geometry of the support element 6. In each of FIG. 4D to 4F the support element 6 is shown with first guide members 19 or second guide members 20 for the disposition and guidance of the connection leads of the conductor wires 9 on the support element 6.

The support element 6 comprises, also according to FIG. 4B, guide members 19, 20 with advantageously rounded-off surfaces or edges, on which the connection leads of the conductor wires 9, or the conductor wires 9, preferably implemented of lacquer-coated copper wire, are in contact. This is especially clearly shown in FIG. 4D. Therewith even already during the mounting of the device damages of the conductor wires 9, for example through contact with sharp edges, are avoided. Such damages to the conductor wires 9 can lead to short circuit currents as well as to a reduction of the insulation resistance of the compressor.

In the region of the radially oriented annular surface 6a the support element 6 is developed with a first guide member 19 which is disposed with a lower end side in particular at the inner side edge of the radial annular surface 6a. The first guide member 19 has the shape of a circumferentially open sector of an axially oriented cylinder-form, in particular hollow cylinder-form, annular surface, which is disposed parallel to the axial annular surface 6b of support element 6. The first guide member 19 is developed such that its lower end side oriented in the axial direction is in contact on the inner side edge of the radial annular surface 6a and connected thereto. The wall of the first guide member 19 and the axial annular surface 6b are extending in opposite directions to one another coupled with the radial annular surface 6a.

The connection leads of the conductor wires 9 guided through openings developed in the radial annular surface 9 are, in particular in the transition region of the wall of the first guide member 19 to the radial annular surface 6a, in contact on support element 6.

The support element 6 can, furthermore, be provided with additional second guide members 20 each in the form of a retaining bracket, which are disposed on the wall of the first guide member 19 projecting outwardly in the radial direction. The second guide members 20 are herein developed as clamping elements oriented parallel to the radial annular surface 6a on an upper end side of the wall of the first guide member 19. The connection leads of the conductor wires 9 are consequently guided or clamped in the axial direction between the radial annular surface 6a and the second guide members 20 such that an unintentional motion of the connection ports of the conductor wires 9 is prevented. In the region of the second guide members 20 with the radial annular surface 6a shapings 21, in particular openings, are provided in order to avoid too high a mechanical pressure through forces acting axially onto the connection leads of the conductor wires 9 clamped between the radial annular surface 6a and the second guide members 20.

Like the receiving member 7 for the plug housing 7b, the first guide member 19 and the second guide members 20 are each implemented as a constituent of the support element 6. Consequently, the support element 6 with the radial annular surface 6a, the axial annular surface 6b, the receiving member 7 with the connection passages 7a for the plug housing 7b and the guide members 19, 20 are implemented as a unit, in particular as an integral injection molding element.

Figure 4F:
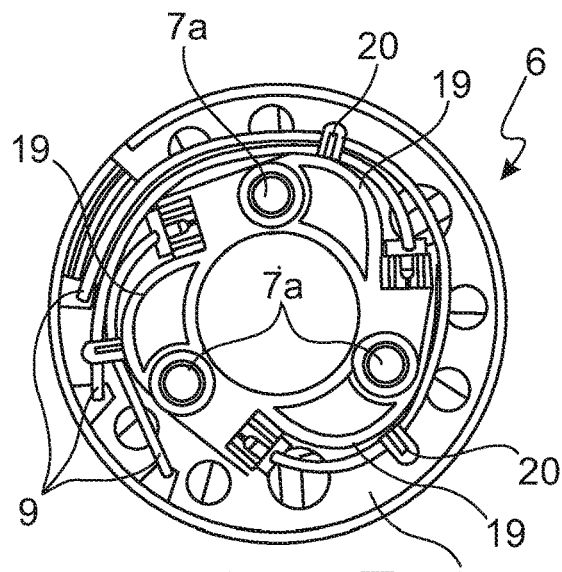
Figure 4E:
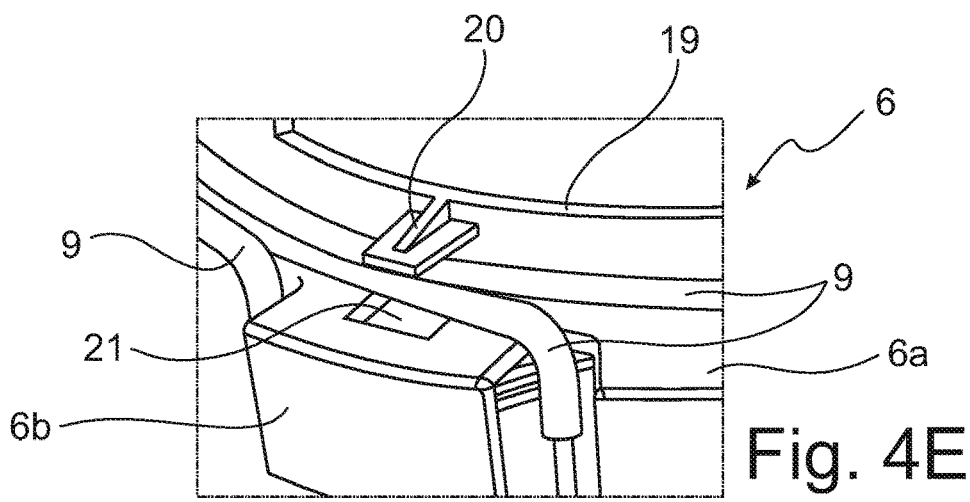

Furthermore, in FIG. 4F an embodiment is shown which comprises three receiving members 7, spaced apart from one another, each for receiving a plug housing 7b for receiving only one connecting element instead of a plug housing 7b for receiving three connecting elements 14 according to FIGS. 3A to 3D, 4A, 4B and 4D. One connection lead of a conductor wire 9 is in each instance herein received in each plug housing.

LIST OF REFERENCE NUMBERS

1 Stator
2 Stator core
3 Coil
4 Insulation element
5 Longitudinal axis
6 Support element
6a Radial annular surface
6b Axial annular surface
7 Receiving member
7a Connection passage
7b Plug housing
8 Pressure member
9 Conductor wire
10 First housing part plug housing 7b
11 Second housing part plug housing 7b
12 Passage opening
13 Feedthrough conductor wire 9 plug housing 7b
14 Connecting element conductor wire 9
14a First connection member conductor wire 9
14b Second connection member conductor wire 9
15 First chamber plug housing 7b
16 Second chamber plug housing 7b
17 Third chamber plug housing 7b
18 Direction of motion plug housing 7b
19 First guide member conductor wire 9
20 Second guide member conductor wire 9
21 Shaping
D Drive shaft
E Electric motor
H Housing
PCB Printed circuit board
R Rotor
SE Switching element
SD Switching device
CA Connecting arrangement
CM Compression mechanism It is claimed:

1. A device, in particular an electric motor, for driving a compressor of a gaseous fluid comprising a rotor and a stator which are disposed extending along a common longitudinal axis, wherein the stator comprises connection leads developed as segments of conductor wires of coils, comprising
at least one plug housing, wherein the at least one plug housing is for receiving at least one connecting element which is electrically connected with a connection lead of a conductor wire and implemented for the electric connection with a plug connector,
a support element disposed on the stator with at least one receiving member for the at least one plug housing, wherein the receiving member comprises at least one connection passage,
wherein the plug housing, which comprises in each instance at least one first chamber, one second chamber and one third chamber each, is slid into the receiving member and is disposed in the receiving member such that each connection passage of the receiving member and the connecting element for receiving a plug connector correspond with one another,
wherein only the first chamber is filled with a potting compound to hermetically seal the plug housing,
wherein the plug housing is developed of a first housing part and a second housing part,
wherein the connecting element is disposed between the first housing part and the second housing part such that it is fixed in position, and
wherein the first housing part is provided with appropriate shapings developed as receivers corresponding to the form of the connecting elements, and a flat bearing surface serves as a lower carrier component for the disposition of the second housing part as an upper cover component.

2. A device according to claim 1, wherein the connecting element comprises a first connection member and a second connection member, wherein the first connection member is electrically connected with the connection lead of a conductor wire and the second connection member is implemented for the purpose of establishing an electrical connection with a plug connector.

3. A device according to claim 2, wherein the plug housing is slid in a predetermined direction of motion into the receiving member and is disposed in the receiving member such that each connection passage of the receiving member and a second connection member of the connecting element for receiving a plug connector correspond with one another.

4. A device according to claim 1, wherein the support element with the at least one receiving member for the at least one plug housing is implemented as a cohesive unit and integral component.

5. A device according to claim 1, the housing parts are implemented such that they are connectable with one another under form closure.

6. A device according to claim 1, wherein in each instance one connection lead of a conductor wire is disposed such that it penetrates into the first chamber as well as through the first chamber up into the second chamber.

7. A device according to claim 6, wherein the connection lead of the conductor wire is inserted through a feedthrough implemented in the second housing part into the first chamber of the plug housing.

8. A device according to claim 1, wherein the connecting element with the first connection member is disposed within the second chamber and with the second connection member is disposed within the third chamber.

9. A device according to claim 2, wherein the second connection member is implemented in the form of an eye for the at least partial encompassment of the plug connector.

10. A device according to claim 1, wherein the support element comprises a radially oriented annular surface and an axially oriented annular surface, wherein the radially oriented annular surface and the axially oriented annular surface are disposed such they are in contact at their outer side edges and are connected with one another.

11. A device according to claim 1, wherein the support element comprises at least one guide member for guiding at least one connection lead of a conductor wire.

12. A device according to claim 11, wherein a first guide member is implemented with a wall in the form of a circumferentially open sector of an axially oriented cylinder-form annular surface.

13. A device according to claim 12, wherein the first guide member is connected at a radially oriented annular surface of the support element with the support element, wherein the at least one connection lead of the conductor wire is in contact in a transition region of the wall of the first guide member to the radial annular surface of the support element.

14. A device according to claim 12, wherein at least one second guide member is developed in the form of a retaining bracket disposed on the wall of the first guide member such that it projects outwardly in the radial direction.

15. A device according to claim 14, wherein the at least one second guide member is implemented on an upper end side of the wall of the first guide member, wherein the connection lead of the conductor wire is disposed between the second guide member and a radially oriented annular surface of the support element.

16. A device according to claim 15, wherein within the radially oriented annular surface of support element a shaping is implemented oppositely to the at least one second guide member in the axial direction.

17. A method for assembling the device for driving a compressor of a gaseous fluid according to claim 1 comprising the following steps:
   disposing a rotor and a stator on a common longitudinal axis, wherein the stator encompasses the rotor in the radial direction,
   disposing a support element at a first end side, oriented in an axial direction, of the stator,
   disposing at least one connecting element with a connection lead, electrically connected with the connecting element, of a conductor wire, or without the connection lead, on a first housing part of a plug housing,
   disposing a second housing part of the plug housing onto the first housing part with the at least one connecting element disposed thereon as well as securing in position the second housing part on the first housing part such that the connecting element is disposed between the housing parts,
   introducing at least one connection lead of a conductor wire through a feedthrough, developed in the second housing part, into the plug housing and connecting the connection lead of the conductor wire with the connecting element after the connecting element without connection lead has been disposed on the first housing part,
   introducing the plug housing into a receiving member implemented on the support element and this way securing the plug housing in position on the support element, as well as filling a potting compound into at least one first chamber of the plug housing via the opening and in this manner connecting the plug housing with the support element well as hermetically sealing the plug housing.

18. A method according to claim 17, wherein the plug housing with the at least one connection lead, electrically connected with the connecting element, of the conductor wire is slid in a predetermined direction of motion into the receiving member of the support element disposed on the stator and fixed in a predetermined final position.

* * * * *